United States Patent [19]

Eriksson

[11] 3,966,495

[45] June 29, 1976

[54] METHOD FOR THE PRODUCTION OF LEAD STORAGE BATTERY ELECTRODES

[75] Inventor: Tore Eriksson, Nol, Sweden

[73] Assignee: Aktiebolaget Tudor, Sundbyberg, Sweden

[22] Filed: Oct. 30, 1974

[21] Appl. No.: 519,193

[30] Foreign Application Priority Data

Nov. 1, 1973 Sweden .............................. 7314903
Nov. 1, 1973 Sweden .............................. 7314904

[52] U.S. Cl. .................................... 136/27; 136/76
[51] Int. Cl.² .......................................... H01M 4/16
[58] Field of Search .......................... 136/27, 34, 76

[56] References Cited
UNITED STATES PATENTS

| | | |
|---|---|---|
| 716,663 | 12/1902 | Browne et al. .......................... 136/76 |
| 2,658,097 | 11/1953 | Orsino ............................... 136/34 X |
| 3,446,670 | 5/1969 | Schilling .......................... 136/27 X |
| 3,607,408 | 9/1971 | Duddy .............................. 136/27 X |
| 3,629,006 | 12/1971 | Hill ..................................... 136/27 |

*Primary Examiner*—John H. Mack
*Assistant Examiner*—C. F. Lefevour
*Attorney, Agent, or Firm*—Burns, Doane, Swecker & Mathis

[57] ABSTRACT

Positive electrodes for lead storage batteries are produced by "forming" the electrodes in an alkaline electrolyte containing an anion which forms a very slightly soluble lead compound. The electrode may also be immersed, prior to forming, in pure water, an aqueous solution of sodium sulfate, and/or sodium hydroxide.

22 Claims, No Drawings

METHOD FOR THE PRODUCTION OF LEAD STORAGE BATTERY ELECTRODES

BACKGROUND OF THE INVENTION

The present application relates to a method for producing positive lead electrodes. More particularly, it relates to a method for producing positive electrodes for lead storage batteries in which a lead core or grid serving as a conductor, is enclosed in a layer of lead dioxide ($PbO_2$).

Positive lead storage battery electrodes can be divided into two main classes, the so-called tubular electrodes, and the so-called "pasted" electrodes. Tubular electrodes are built up on lead grids consisting of a number of rods protruding from a combining strip. Around each rod there is placed a sheath, and the active material is charged into the space between the sheath and the rod. The tube is thereafter closed in a suitable way. When it is charged into the spaces between the sheath and the rod, the active material must be in the form of a dry powder with good rheological properties. Pasted electrodes are built up on a lead grid which is generally in some checkerboard form. Starting with a lead oxide of essentially the same kind used in the manufacture of tube electrodes, a paste is produced by the addition of suitable amounts of water and sulfuric acid, and possibly other additives. The mass thus prepared is then applied to the lead grid, either manually or automatically.

No matter what the type of electrode in question, it must be subjected to a so-called "forming" step in a subsequent manufacturing procedure. This "forming" is the initial charge of the electrodes, whereby substantially all of the active material is changed to lead dioxide. Forming is of great importance for the future properties of the electrode, both with respect to its capacity and to its life expectancy.

Three essential problems arise in the "forming" step, however, which are of great significance for the quality of the finished electrode. The active material that is delivered as a fine-grain powder has no mechanical strength, and the electrodes therefore are sensitive to mechanical stress. They have to be handled with great caution. Besides, the pulverous material has a certain tendency to work out through the porous sheath. If too much material is thus removed from the electrode, this obviously affects the quality; but, above all, it creates a problem with respect to the environment because the powder, which primarily consists of various lead oxides, is very poisonous. Finally, various modifications of the lead dioxide can be produced during the "forming" so that it is essential that "forming" occur in the most favorable circumstances possible for the production of the preferred form of lead dioxide.

"Forming" is a conventional procedure and is well known to those skilled in the art of manufacturing lead storage batteries. In substantially all methods thus far known, the forming has been effected in sulfuric acid electrolyte. The forming electrolyte generally has a lower density than the electrolyte that is intended for use in service in the finished battery. A customary elecctrolyte density for forming is 1.10–1.15 gram per cc.

It has been known that forming can be conducted in electrolytes other than sulfuric acid. One such electrolyte used in forming positive electrodes is an ammonium sulfate solution. However, this electrolyte has been regarded as one that entails special complications for positive electrodes. A method is also known for forming positive electrodes in two steps, in different alkaline electrolytes. Here, a weakly alkaline electrolyte is used in the first step, and in the second, a strongly alkaline electrolyte. This obviously involves complications in manufacture since it requires an additional step and all of the equipment needed to perform it.

In forming, the effort is made, on the one hand, to obtain good electrical contact between the lead conductor and the active material, and, on the other hand, to have good mechanical strength as well as a favorable structure in the active material, so that the electrode will have high capacity and a long life expectancy.

The form of lead dioxide that is sought in electrode manufacture is $\alpha$-$PbO_2$. This form imparts desirable mechanical properties to the electrodes. Although electrodes with large quantities of $\alpha$-$PbO_2$ have a relatively low initial capacitance, this is of slight importance because there is a working up of the electrodes, and the electrodes with large amounts of $\alpha$-$PbO_2$ have proved to be superior in the matter of life expectancy.

One object of the present invention is to provide a method for the production of positive electrodes for use in lead storage batteries having improved electrical contact between the lead conductor and the active material.

Another object of this invention is to provide a method for the production of positive electrodes for use in lead storage batteries having improved mechanical strength.

Still another object is to provide a method whereby substantially all of the lead dioxide in the formed electrode is the $\alpha$- form ($\alpha$-$PbO_2$).

A further object of the present invention is to provide a method for the production of positive lead dioxide electrodes having improved capacity as a result of high porosity.

SUMMARY OF THE INVENTION

The foregoing objects and benefits and others which will be apparent to those skilled in the art are achieved by means of the invention, as described more fully below.

More paarticularly, the foregoing objects and benefits are achieved as the result of modifications in the prior conventional "forming" step, as well as by the use of novel electrolytes in that step.

In general, in accordance with the present invention, forming is carried out in an alkaline electrolyte.

It was known heretofore that lead storage batteries could be formed in an alkaline electrolyte. However, the electrodes were formed without pretreatment, and it was necessary to undertake special forming methods. For example, one method involved a procedure wherein, in a first step, forming was carried out in a weakly alkaline electrolyte and thereafter, for the most part, in a strongly alkaline electrolyte.

Surprisingly, it was discovered that, according to one aspect of the present invention, positive electrodes can be formed in one step in an alkaline electrolyte. More particularly, according to this embodiment, forming occurs in an alkaline electrolyte in which there is dissolved a salt whose anion yields a very slightly soluble lead compound. This embodiment is particularly useful for the production of electrodes with high porosity and of electrodes in which the lead alloy that is used for the lead grid is free of antimony. In a preferred form of this aspect of the invention, sodium sulfate ($Na_2SO_4$) is added to an aqueous solution of sodium hydroxide of such concentration that a pH of from about 11–13 is maintained.

A second embodiment of the present invention also forms the positive electrode in an alkaline electrolyte. However, this second embodiment involves a preliminary dip in a liquid, prior to forming, as described more fully below.

It was known heretofore, in manufacture of lead storage battery electrodes, that they can be dipped in a liquid. The liquid generally used was water or sulfuric acid. However, this method was utilized for the production of negative electrodes, for the special purpose of preventing unintended lead oxidation. Such a treatment of the electrodes, because of its brief duration, could not produce the same effects that a treatment according to the invention does, even if applied to positive electrodes. Soaking in sulfuric acid for more than 10 hours is being used for sulfating the positive electrodes before formation.

In accordance with the second embodiment of this invention, it was further surprisingly discovered that conditions favorable to the production of a good structured $\alpha$-$PbO_2$ can be created if the electrodes, prior to the forming step, and preferably just after the addition of the active material to the sheath, are dipped in a liquid having a pH no lower than 4, so that the liquid phase inside the electrodes will have a pH above 7. The immersion should last long enough so that essentially all surfaces of the active material will be wet by the liquid. The liquid in which the dipping occurs may be pure water. However, it has been found advantageous, and it is preferred, to add sodium sulfate or sodium hydroxide, or a mixture of these two compounds, to the water. It is advantageous that the liquid be adjusted so that solubility for PbO in the liquid inside the electrodes will be $10^{-5}$–$10^{-2}$ moles, preferably within the range of $10^{-4}$–$10^{-3}$ moles. After being thoroughly wet with this liquid, the electrode can be formed in a single step in an alkaline electrolyte. Although the pH can vary within broad limits, the preferred pH of about 11–13 has been found to be particularly advantageous. Preferably, the forming is effected in an alkaline electrolyte in which a salt is dissolved whose anion yields a very slightly soluble lead compound.

DESCRIPTION OF THE PREFERRED EMBODIMENTS

EXAMPLE 1

An electrolyte having a pH within the range of 11–13 was prepared by dissolving 4 grams of sodium hydroxide in a liter of water. A tubular electrode, containing about 25% Pb-powder and 75% PbO-powder pf fine grain as the active material, was subjected to forming according to conventional procedures.

EXAMPLE 2

An unformed tube electrode, similar to the one used in Example 1, was dipped into water and kept immersed at least for 30 minutes or until all of the surfaces were wet. The electrode was then formed in a single solution of an alkaline electrolyte adjusted to a pH of between 11 and 13 by dissolving 4 grams of sodium hydroxide and 77 grams of sodium sulfate in a liter of water.

EXAMPLE 3

An unformed tube electrode, as in the previous examples, was dipped in a solution made by dissolving 4 grams of sodium hydroxide and 15 grams of sodium sulfate in a liter of water. At these concentrations, the solubility of the lead monoxide (PbO) had a maximum solubility of $10^{-2}$ moles. After being thoroughly wet with this solution, the electrode was dried and formed in an electrolyte made by dissolving 4 grams of sodium hydroxide and 77 grams of sodium sulfate in a liter of water.

In all of the above examples, the formed electrodes contained an increased percentage of the $\alpha$-$PbO_2$ and exhibited exceptional mechanical strength and porosity. In the electrode produced in Example 3, substantially all of the original lead materials charged into the tube electrode was converted to a mechanically strong alpha-lead dioxide ($\alpha$-$PbO_2$).

Without being bound by the correctness of the reasons given for the production of the improved positive electrodes in accordance with the present invention, it is believed that what takes place during forming may be explained in the following manner.

Because forming occurs in an alkaline medium, the production of the lead dioxide form known as $\alpha$-$PbO_2$ is promoted. Although a high proportion of $\alpha$-$PbO_2$ results in a lower initial capacity in the electrodes. The electrodes subsequently are worked up and the mechanical, and electrical properties are more favorable with $\alpha$-$Pb_2$. In alkaline forming, the conversion of the active material generally occurs inward from the outer zone of the electrode. At the same time, electrodes made according to the present invention possess a coarser crystalline structure inside the active material than at the surface which is pronounced around the lead conductors in the rods of the tubular electrodes. This presumably is caused by fact that a salt is dissolved in the electrolyte whose anion yields a very slightly soluble lead compound. Starting from an electrolyte that contains NaOH and $Na_2SO_4$. Which has proved to be very suitable, this phenomenon can be explained as follows. By addition of sodium sulfate or other similar salt, there is a rise of the pH inside the electrode when the electrode is dipped in the electrolyte. The equilibrium potential for formation of lead dioxide drops prouncedly with rising pH, and forming therefore occurs outward, from the interior of the electrode. Since the lead oxides also are more readily soluble at higher pH, this brings about such conditions for crystal formation that a coarser structure is formed in the interior of the electrode. It has beem shown that especially favorable conditions for forming are obtained if the pH of the electrolyte that is utilized is 11–13.

The invention has been described in the foregoing specification and in the specific examples. It will be obvious that the specific conditions, electrolytes, and dissolved salts can be varied without departing from the spirit of the invention, and that any electrolyte having a pH about within the range of 11–13, or which has dissolved in it a salt whose anion yields a very slightly soluble lead compound will fall within the scope of the invention. As will be apparent to those skilled in the art, the examples are illustrative only and should not be construed as a limitation on the scope of the invention, and that the invention is not limited except as set forth in the claims which follow.

What is claimed is:

1. A process for the preparation of positive lead storage battery electrodes wherein an active material comprising lead monoxide dry powder surrounded by a sheath is converted to lead dioxide which consists essentially of immersing an electrode containing such active material in a single forming solution of an alkaline electrolyte having a pH of about 11–13 and thereafter forming the electrode in said electrolyte to convert the active material to lead dioxide.

2. A process as in claim 1 wherein the electrolyte has dissolved therein a salt whose anion yields a very slightly soluble lead compound.

3. A process as in claim 1 wherein the entire forming process is conducted in the same electrolyte.

4. A process as in claim 1 wherein the electrodes containing the dry powder are immersed in a liquid having a pH no lower than 4 until all of the surfaces of the active material are wetted prior to forming.

5. A process as in claim 2 wherein the dissolved salt is sodium sulfate.

6. A process as in claim 4 wherein the pH of the liquid is such that the liquid phase within the electrodes has a pH greater than 7.

7. A process as in claim 4 wherein the electrodes are immersed in pure water prior to forming.

8. A process as in claim 4 wherein the electrodes are immersed in an aqueous solution of sodium sulfate prior to forming.

9. A process as in claim 4 wherein the electrodes are immersed in an aqueous solution of sodium hydroxide prior to forming.

10. A process as in claim 4 wherein the electrodes are immersed in an aqueous solution containing sodium hydroxide and sodium sulfate prior to forming.

11. A process as in claim 4 wherein the lead monoxide in the active material has a solubility of about from $10^{-5}$ to $10^{-2}$ mole in the liquid phase within the electrode.

12. A process as in claim 4 wherein the electrode is immersed in the aqueous liquid for at least 30 minutes prior to forming.

13. A process as in claim 4 wherein the forming is effected in an alkaline electrolyte.

14. A process as in claim 10 wherein the aqueous solution has a pH of above 4.

15. A process as in claim 11 wherein the solubility of the lead monoxide is about from $10^{-4}$ to $10^{-3}$ mole.

16. A process as in claim 13 wherein the pH of the electrolyte is 11–13.

17. A process as in claim 13 wherein the entire forming operation is effected in the same electrolyte.

18. A process as in claim 16 wherein the electrolyte is a solution of sodium hydroxide.

19. A process as in claim 16 wherein the electrolyte is a solution of a salt having an anion that yields a very slightly soluble lead compound.

20. A process as in claim 16 wherein the electrolyte is a solution of sodium hydroxide and a salt having an anion that yields a very slightly soluble lead compound.

21. A process as in claim 19 wherein the salt is sodium sulfate.

22. A process as in claim 20 wherein the salt is sodium sulfate.

* * * * *